Patented June 7, 1927.

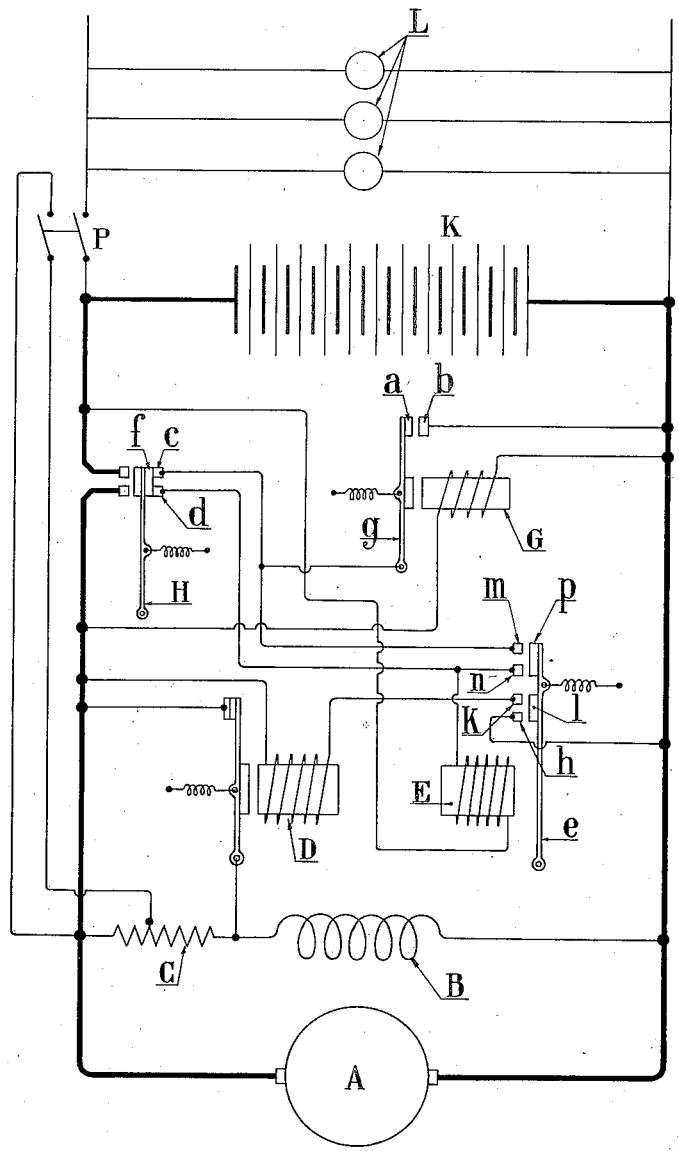

1,631,574

UNITED STATES PATENT OFFICE.

HENRI BÉNIT, OF PARIS, FRANCE, ASSIGNOR TO L'ECLAIRAGE DES VEHICULES SUR RAIL, OF PARIS, FRANCE, A FRENCH CORPORATION.

SYSTEM OF ELECTRICAL SUPPLY.

Application filed November 9, 1923, Serial No. 673,647, and in France November 9, 1922.

The present invention has for its object certain improvements in apparatus generally known as battery limiting switches or charging interrupters frequently used in installation comprising a generator, one or more storage batteries and the exterior circuit connected in parallel.

These electromagnetic limiting switches act either on the circuit itself or on the excitation of the dynamo or on the field regulator of the dynamo, reducing or cutting off the voltage of said dynamo as soon as the battery voltage has reached a predetermined value which may be that of the final charging voltage.

These apparatus do not generally permit desulphating of sulphated lead batteries for the reason that as soon as such a battery is inserted into a charging circuit the voltage which must be applied to its terminals in order to overcome its internal resistance is equal to or higher than the final charging voltage of said battery if it is in normal condition. In order to avoid premature operation of the limiting switch in the case of sulphated batteries it has been proposed to control said limiting switch by means of a relay operating under strictly determined conditions. It may be imagined, for instance, that such a relay operates under the action of the current furnished by the dynamo and only when the charging current corresponds to the current traversing a battery in normal condition, and, on the other hand, that it does not operate as long as this current is below a predetermined value.

The operation of such a device is easily understood but its operation is not absolutely certain as the charging current of a sulphated battery varies according to its state of sulphation and may be higher than the predetermined current value with a voltage which is also higher than that fixed for the operation of the limiting switch.

The present invention has for its object the application of a relay based on entirely different and new principles. This relay is so designed that it operates with absolute certainty when the battery is sulphated whatever may be the state of this sulphation, even if it has just commenced.

Besides the limiting switch the equipment comprises two relays: the first, which is an auxiliary relay, has for its purpose to connect the second relay, named desulphation relay, to the battery terminals when the dynamo is started. The purpose of this second relay is, according as the battery is sulphated or not, to prevent the action of the limiting switch or to permit its operation.

In the accompanying drawing A indicates the dynamo, B, the field-winding of the dynamo, C a resistance in series with said field-winding, D the limiting switch, E the desulphation relay and G the relay controlling the desulphation relay; H is the automatic switch of the usual type but provided with a supplementary contact; K indicates the storage battery, L the lamps and P the lighting switch for the lamps.

The operation is as follows:

As soon as the dynamo starts rotating and has attained, for instance, a tension of a few volts, the coil of the relay G is traversed by a current; it attracts the armature $g$ and establishes connection between the contacts $a$ and $b$. The contacts $c$ and $d$ being joined through the contact $f$ of the automatic switch, the coil of the relay E is connected between the terminals of the battery long before the dynamo voltage has attained the voltage at which the automatic switch operates.

If the battery is in good condition, i. e., if it has a terminal voltage of for instance $N \times n$ volts, N being the number of cells, which we will suppose are lead cells, and $n$ volts the voltage of one cell in good condition, the coil E will attract the armature $e$ thus establishing connection between the contacts $h$ and $k$ through the contact $l$ which will permit the operation of the limiting switch or any other similar device.

It must be noted that due to the closing of the contacts $m$ and $n$ through the contact $p$, brought about by the operation of the automatic switch, the coil of the relay E will always be alive, i. e. will always keep the armature e attracted or, in other words, will always permit operation of the limiting switch under the supposed normal conditions.

If, on the contrary, the battery is sulphated or in bad condition, that is, if its terminal voltage is below the above mentioned value N x n, the relay E will not attract the armature, thus leaving the limiting switch D out of circuit. In this case, as soon as the automatic switch operates, connecting the battery in parallel with the dynamo, the coil E is automatically disconnected from the terminals of the battery and can no longer attract the armature e although the battery voltage then rises with that of the dynamo. Under these conditions, the limiting switch being out of action, nothing prevents the desulphation of the battery.

In other words, in order to permit the operation of the relay E and thereby of the limiting switch D the battery must not be sulphated; in that case it acts before the automatic switch. If the battery is sulphated it does not operate, neither before nor after the automatic switch. As, in the applications in view, the dynamo does not rotate in an absolutely continuous manner all the relays will return to their rest position at the first stop and when the dynamo is restarted, if the battery is desulphated, the limiting switch will be ready to operate and will cut off the current to the battery when this has attained its final charging voltage.

The equipment is completed by a double contact switch, which in closed position shunts a portion of the resistance C. The dynamo may therefore continue to furnish the necessary lamp current even after the operation of the limiting switch, provided, of course, that the disposition of the equipment demands the operation of the limiting switch also during the lighting periods.

According to the requirements the relay G may be left out, all the other arrangements remaining the same.

The limiting switch D may be of any design and it may act in any manner either on the excitation of the dynamo or on the field regulator.

It is clearly understood that the diagram is given only by way of example in order to illustrate the operation, object and principle of the invention, as all other cases comprising the use of a limiting switch, whatever may be its principle of operation, controlled by one or two relays as above described, can not be considered here. This is also the case as regards all apparatus which may be used to obtain the same results.

The present invention may be applied to installations comprising lead accumulators and, of course, also to installations comprising other types of accumulators having similar characteristics.

I claim:

1. In a system of electrical supply, a generator, an accumulator, a circuit connecting said generator and said accumulator in parallel, a current-limiting device controlling the output of said generator, an automatic switch in said circuit, a relay adapted to condition said current-limiting device for operation, and means associated with said automatic switch for preventing said relay from functioning when the resistance of the accumulator is high at the beginning of the charging operation.

2. In a system of electrical supply having a generator provided with a field winding, a secondary battery, a circuit connected with said generator and battery, a field circuit for said generator, an automatic switch in said first-mentioned circuit, and a limiting switch in said field circuit, the combination of a relay, and a second relay, the first relay being adapted to connect the second relay to the battery terminals on the starting of the generator, and the second relay being adapted to prevent or permit the operation of the limiting switch, depending upon whether the battery is sulphated or not.

3. In a system of electrical supply, the combination with a generator, a secondary battery, a circuit connected in parallel with said generator and battery, a field circuit for said generator, an automatic switch in said first circuit, and a limiting switch in said field circuit, of a relay cooperating with said limiting switch, and means for operating the relay so arranged and connected that the relay will condition the limiting switch for operation only when the battery to be charged is not sulphated.

4. In a system of electrical supply, the combination with a generator, an accumulator, a circuit connecting said generator and said accumulator in parallel, a field circuit for said generator, a limiting switch in said field circuit, and an automatic switch in said first circuit; of a relay adapted to condition the limiting switch for operation when the accumulator to be charged is in normal condition, and means for preventing said relay from functioning when the accumulator is sulphated, and thereby permitting the accumulator voltage to rise with that of the generator.

5. In a battery charging system including a generator, a storage battery and an automatic switch in series circuit, a field circuit for the generator including a limiting switch, means for automatically operating said limiting switch under predetermined conditions and relay means cooperating with said operating means whereby to prevent premature operation of said limiting switch when the battery is sulphated.

6. In a system of electrical supply, a generator, an accumulator, a circuit connecting said generator and said accumulator in parallel, a current-limiting device adapted to control the output of said generator, an automatic switch in said circuit, a relay adapted to condition said current-limiting device for operation, and an auxliary relay adapted to prevent the operation of said first-mentioned relay when the resistance of the accumulator is high at the beginning of the charging operation.

In testimony whereof I have signed my name to this specification.

HENRI BÉNIT.